United States Patent [19]

Kowalewski et al.

[11] Patent Number: 4,764,715

[45] Date of Patent: Aug. 16, 1988

[54] ELECTRONIC SERVICE TIMER FOR AN APPLIANCE

[75] Inventors: Rolf E. Kowalewski, Palatine; Charles J. Schmitz, Arlington Heights, both of Ill.

[73] Assignee: Motorola, Inc., Schaumburg, Ill.

[21] Appl. No.: 62,528

[22] Filed: Jun. 15, 1987

[51] Int. Cl.⁴ ............................................... H02J 7/00
[52] U.S. Cl. ........................................ 320/13; 320/37; 340/309.15
[58] Field of Search ............ 320/13, 37, 38, 2; 337/302; 357/29; 340/309, 15, 52 D

[56] References Cited

U.S. PATENT DOCUMENTS

| | | | |
|---|---|---|---|
| 3,560,802 | 2/1971 | Mountjoy et al. | 320/37 X |
| 3,938,128 | 2/1976 | Pidsosny et al. | 340/309.15 |
| 4,014,499 | 3/1977 | Hamilton | 337/302 X |
| 4,275,405 | 6/1981 | Shannon | 357/29 X |
| 4,290,429 | 9/1981 | Blaser | 128/419 PT |
| 4,380,726 | 4/1983 | Sado et al. | 320/48 |
| 4,539,632 | 9/1985 | Hansen et al. | 340/309.15 X |
| 4,551,000 | 11/1985 | Kanemitsu et al. | 355/3 R |
| 4,567,516 | 1/1986 | Scherer et al. | 320/37 X |

Primary Examiner—Patrick R. Salce
Assistant Examiner—Anita M. Ault
Attorney, Agent, or Firm—Robert J. Crawford

[57] ABSTRACT

A circuit is described for timing the intermittent use of an appliance, wherein the appliance includes a usage signal for indicating that the appliance is in use. The circuit includes a battery, and a resistive network, coupled to the battery, for draining power from the battery such that the power level thereof decreases to a threshold level over a selected timing interval. The circuit further includes a switch, responsive to the usage signal, for selectively enabling the resistive network, and a battery level threshold detector, responsive to the battery reaching the threshold level, for indicating that the timing interval has lapsed, thereby alerting the operator that the appliance should be serviced, which service includes replacement of the low cost battery.

7 Claims, 1 Drawing Sheet

ELECTRONIC SERVICE TIMER FOR AN APPLIANCE

FIELD OF THE INVENTION

The present invention relates generally to electronic timing, and, more particularly, to the practice of electronically timing the intermittent use of a device, or appliance.

DESCRIPTION OF THE PRIOR ART

Known techniques for electronically timing the intermittent use of a device (appliance) may be categorized into three areas. The first area encompasses electric clock circuits. These circuits employ an electric clock which is enabled when the appliance is turned on in order to time the use of the appliance. The use time of the device is provided by the clock readout.

The second area includes techniques employing metallic build up on an electrolytic plating cell. Metal is constantly deposited at the cathode of the plating cell when the device being timed is in use. The amount of plated metal is visible through the glass walls of the cell where the use time of the device can be determined from graduations.

Third, electronic counters are used in a manner similar to the clock circuits, described above, to time the use of the appliance. An oscillator, operating at a fixed frequency, is provided to a counter while the appliance is operating, and removed while the appliance is idle. At the output of the counter, a "count" is used to determine the time the appliance has been used.

Unfortunately, there are disadvantages associated with each of these known techniques. First, each of these techniques is relatively costly. This is especially true when attempting to provide such a timing function for a home appliance where cost is an essential factor.

A second disadvantage is associated with appliances which use electronic timing methods and which require external power for operation. Such appliances require an internal battery to sustain the timing information while the external power to the appliance is disabled. If the life of the battery naturally terminates before the timing information is accessed, the timing information is forever lost.

Accordingly, there is a need for a circuit for timing the intermittent use of an appliance which overcomes such deficiencies.

OBJECTS OF THE INVENTION

It is a general object of the present invention to provide an appliance usage timer which may be employed for cost conscious applications.

It is a more specific object of the present invention to provide an appliance usage timer which alerts the appliance operator when the appliance requires service and which is not susceptible to failure due to natural battery life termination.

It is yet an additional object of the present invention to provide an appliance usage timer which may be used over relatively long periods of time.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in which like reference numerals identify like elements, and wherein:

DETAILED DESCRIPTION OF THE PREFERRED EMBODIMENT

The invention disclosed in this specification has particular use for timing of the intermittent use of devices (electrical, mechanical and electro-mechanical). More particularly, this invention has applicability for timing the intermittent use of an appliance and for alerting the appliance operator that a predetermined period of appliance use time has been reached, indicating, for example, that the appliance should be serviced. The invention is best suitable for such devices (appliances) as vacuum cleaners, lawn mowers, industrial machinery and boat motors, all of which are intermittently operated and require periodic service based on the operation time, but may also be used to time the continuous use of appliances.

Figure 1:
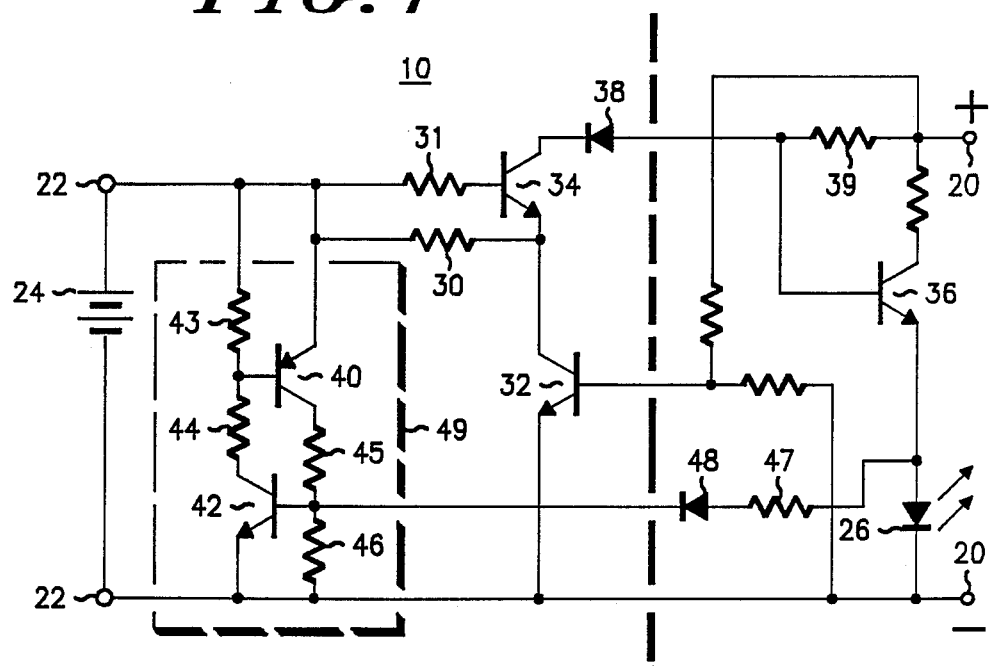
FIG. 1 is a circuit diagram of a service timer in accordance with the present invention.

FIG. 1 illustrates a circuit 10 which provides for such timing. External DC power, not shown, is provided to the circuit at terminals 20, while a power cell 24, such as a Lithium or Alkaline cell (e.g. Manganese Dioxide, Mercuric Oxide, or Silver Oxide) is provided at terminals 22. A Lithium or Alkaline cell is preferred due to the low discharge rate associated therewith. In a modernly designed Lithium or Alkaline primary cell, the inherent low internal impedance and precisely controlled service capacity permit external resistance to essentially determine the current flow therefrom; hence, the discharge time. As will be described below, control of the discharge time of the power cell 24 is a central aspect of the present invention.

When power is provided at the terminals 20, the appliance is considered to be in operation and the circuit 10 begins timing the appliance use. Thus, the presence of power at terminals 20 acts to signal the circuit 10 that the applicance is in use.

The primary function of the power cell 24 is to act as a timer such that the power cell 24 is forced to discharge to a threshold level over a selected "use" interval. Another portion of the circuit 10 establishes the rate of discharge of the power cell and selectively controls when such discharge will occur. Preferably, the power cell 24 discharges only when the appliance is operating. When the power cell 24 discharges to a threshold power level, such as a voltage level indicative of the end life of the power cell, a transistor 36 activates an LED 26 to notify the operator that service is required. The power cell is replaced during such service.

The discharge time is predetermined, measurable through conventional battery life tests, according to the power cell type. It should be apparent that the longer the shelf life of the power cell, with respect to its operating life, the greater the accuracy of the estimated discharge time.

More particularly, in order to discharge the power cell 24, a primary discharge path is provided through a pair of resistors 30 and 31 and the collector path of a transistor 32. The base-emitter junction of the transistor 32 is forward biased by the external power at terminals 20 so that when the external power is disabled (when the appliance is no longer operating), the discharge path through the collector of transistor 32 is "opened" (effectively disconnected), thereby allowing the power cell 24 to discharge only during operational appliance use.

The step of disconnecting the discharge path, through the collector of transistor 32 is accomplished by driving the base of transistor 32 by the external DC power. When the DC power is no longer present, transistor 32 turns off.

The power cell 24 is also used to forward bias the base-emitter junction of a transistor 34 while the primary current path (through the collector path of transistor 32) is "closed" whereby current is flowing through the current path. While this primary current path is closed, a current path is provided from the external DC supply at terminals 20, through a resistor 39 and a diode 38. The base of transistor 36 is effectively grounded through the respective collector current paths of transistors 34 and 32 to prevent the LED from turning on while the power cell is forward biasing the transistor 34.

After the power cell 24 discharges for a preselected amount of appliance operation time, the power level, i.e., the voltage and/or current level, of the power cell 24 decreases until it reaches a threshold level, at which point the base-emitter junction of the transistor 34 is no longer forward biased. When this occurs, the current path through the collector of transistor 34 and diode 38 (provided by the external power at terminals 20) is "opened" and current through resistor 39 can then flow through the base emitter junction of transistor 36 so as to provide current from the DC power at terminals 20 through the collector path of transistor 36 and the LED 26, coupled thereto, to alert the operator that the appliance has been operated for the selected period of time, i.e. service is needed.

When transistor 36 is turned on, emitter current flows through a resistor 47 and a diode 48 to forward bias the base-emitter junction of a transistor 42 and to set a latch 49, comprising transistors 40 and 42 and resistors 43, 44, 45 and 46. Once the latch 49 is set it remains set until the remaining energy of the power cell 24 is exhausted, i.e., until insufficient current is available from the power cell 24 to hold the latch 49 in the set mode. This latching is advantageous in that it prevents the power cell 24 from recovering to an operative power level.

It should be noted that diode 38 is provided between the collector of transistor 34 and the external power to prevent the power cell 24 from discharging through the base-collector junction of transistor 34 while the appliance is not in use.

Figure 2:
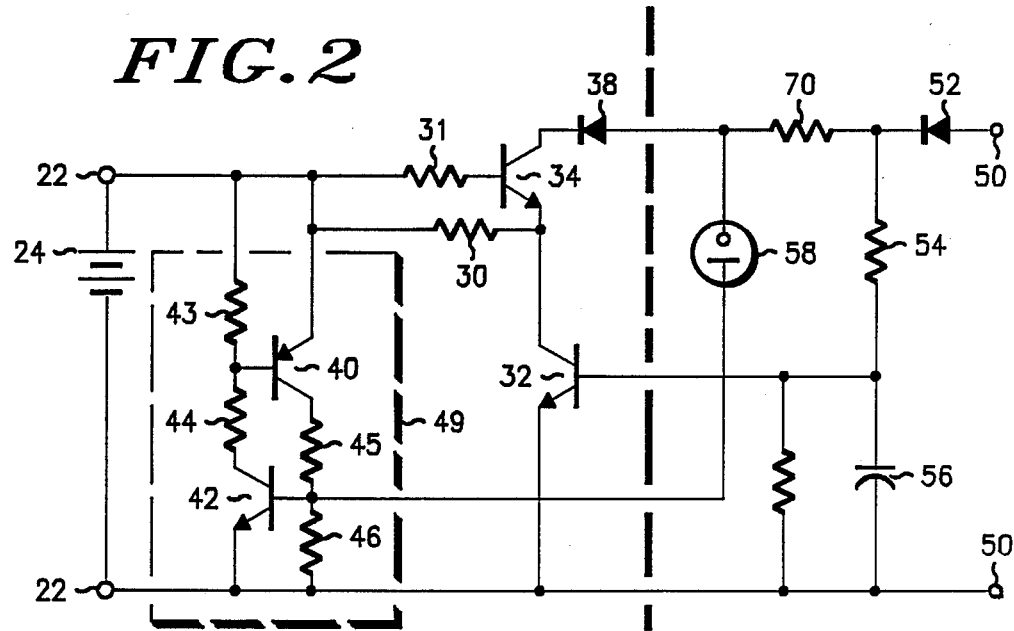
FIG. 2 is an alternative circuit diagram of a service timer in accordance with the present invention.

In FIG. 2, a similar circuit is illustrated for application to an external AC supply at terminals 50. The left half of the dotted lines in each of FIGS. 1 and 2 illustrate identical circuits. On the right half of dotted lines, rather than directly controlling the base-emitter junction of transistor 32 with the DC supply (as in FIG. 1), the AC supply is rectified, through a diode 52 and a series resistor-capacitor 54–56 arrangement, before coupling the supply to the base-emitter junction of transistor 32.

Further, a neon bulb 58 is coupled from the junction of diode 38 and resistor 70 to the base of transistor 42 such that when the power cell 24 drops below the threshold power level, transistor 34 is biased off, and, consequently, a current path is provided from the AC power at terminals 50 through the neon bulb 58 to set the latch 49 and to alert the operator that the appliance is due for service.

Accordingly, the present invention provides a low cost circuit arrangement for timing the intermittent use of an appliance and for alerting the operator that a predetermined usage time has been reached. Moreover, although the circuit requires a power cell, unlike those previously known inventions requiring a power cell, the present invention cannot fail as a result of the power cell naturally reaching its threshold voltage.

It will be understood by those skilled in the art that various other modifications and changes may be made to the present invention without departing from the spirit and scope thereof.

What is claimed is:

1. A circuit for timing the intermittent use of a device having a usage signal for indicating that the device is in use, comprising:
   a power cell
   first means, coupled to the power cell, for draining power from the power cell such that the power level thereof decreases to a threshold level over a selected timing interval;
   second means, responsive to the usage signal, for selectively enabling the first means;
   third means, responsive to the power cell reaching the threshold level, for indicating that the timing interval has lapsed; and
   discharge means, responsive to said second means, for draining power from the power cell to prevent the power cell from recovering.

2. A circuit for timing the intermittent use of a device, according to claim 1, wherein said discharge means is a latch which is set in response to said third means indicating that the discharge interval has lapsed.

3. A circuit for timing the intermittent use of a device, according to claim 1, wherein said third means is powered independently of the power cell.

4. A circuit for timing the intermittent operational use of a device having a usage signal for indicating operation thereof, comprising:
   a power cell;
   first means, coupled to the power cell, for drainin power from the power cell;
   control means, responsive otthe ussage signal, for substantially disabling the first means while the device is not operating;
   threshold detection means, coupled to the power for monitoring the power level thereof and for detecting when the power level reaches a threshold level;
   means, responsive to said threshold detection means, for draining power from the power cell to prevent the power cell from recovering; and
   alert means, responsive to the threshold detection means, for generating an alert signal in response to the detection of the threshold level.

5. A circuit for timing the intermittent operational use of a device, according to claim 4, wherein the alert means includes a visual indicator which is responsive to the usage signal.

6. A circuit for timing the intermittent operational use of a device, according to claim 4, wherein the control means includes a switch, coupled to the first means, for activating and deactivating said first means.

7. A circuit for timing the intermitten use of a device having a usage signal for indicating that the device is in use, comprising:
   a power cell;

first means, coupled to the power cell for draining power from the power cell such that the power level thereof decreases to a threshold level over a selective timing interval;

indicator means, responsive to the power cell reaching the threshold level, for indicating that the timing interval has lapsed; and second means for enabling the first means in response to the usage signal and for enabling the first means in response to the indicator means indicating that the timing interval has lapsed.

* * * * *

UNITED STATES PATENT AND TRADEMARK OFFICE
CERTIFICATE OF CORRECTION

PATENT NO. : 4,764,715

DATED : August 16, 1988

INVENTOR(S) : Kowalewski, Rolf E. Et Al.

It is certified that error appears in the above-identified patent and that said Letters Patent is hereby corrected as shown below:

Column 4, line 43, please replace "drainin" with --draining--

Column 4, line 45, please replace "otthe ussage" with --to the usage--.

Signed and Sealed this

Third Day of January, 1989

Attest:

DONALD J. QUIGG

Attesting Officer      Commissioner of Patents and Trademarks